(12) United States Patent
Tuli (10) Patent No.: US 12,038,670 B2
(45) Date of Patent: Jul. 16, 2024

(54) CAMERA SUPPORTED BY SOLAR WAFER

(71) Applicant: Raja Singh Tuli, Montreal (CA)

(72) Inventor: Raja Singh Tuli, Montreal (CA)

(*) Notice: Subject to any disclaimer, the term of this patent is extended or adjusted under 35 U.S.C. 154(b) by 0 days.

(21) Appl. No.: 17/550,037

(22) Filed: Dec. 14, 2021

(65) Prior Publication Data
US 2022/0197116 A1 Jun. 23, 2022

Related U.S. Application Data

(60) Provisional application No. 63/127,296, filed on Dec. 18, 2020.

(51) Int. Cl.
*G03B 15/03* (2021.01)
*H02J 7/35* (2006.01)
*H04N 7/18* (2006.01)
*H04N 23/50* (2023.01)
*H04N 23/65* (2023.01)

(52) U.S. Cl.
CPC ............ *G03B 15/03* (2013.01); *H02J 7/35* (2013.01); *H04N 7/183* (2013.01); *H04N 7/188* (2013.01); *H04N 23/50* (2023.01); *H04N 23/651* (2023.01)

(58) Field of Classification Search
USPC ................... 396/301, 427; 348/143
See application file for complete search history.

(56) References Cited

U.S. PATENT DOCUMENTS

| | | | | | |
|---|---|---|---|---|---|
| 8,031,264 | B2* | 10/2011 | Iwamura | ............... | H04N 7/181 |
| | | | | | 348/373 |
| 2009/0058663 | A1* | 3/2009 | Joshi | ............... | G01D 21/00 |
| | | | | | 340/584 |
| 2009/0086025 | A1* | 4/2009 | Ngu | ............... | H04N 23/50 |
| | | | | | 348/E7.085 |
| 2015/0172518 | A1* | 6/2015 | Lucas | ............... | B60R 11/04 |
| | | | | | 348/148 |
| 2021/0314529 | A9* | 10/2021 | Siann | ............... | H04N 23/51 |
| 2022/0116535 | A1* | 4/2022 | Gaw | ............... | H04N 23/60 |
| 2022/0402397 | A1* | 12/2022 | Nishimura | ............... | H02J 7/02 |

FOREIGN PATENT DOCUMENTS

| | | | | | |
|---|---|---|---|---|---|
| FR | 3012933 A1 | * | 5/2015 | ............ | G03B 17/561 |
| JP | 2000092362 A | * | 3/2000 | | |

* cited by examiner

*Primary Examiner* — Clayton E. LaBalle
*Assistant Examiner* — Warren K Fenwick (57) ABSTRACT

A camera assembly is provided therein that comprises a camera subsystem configured to provide camera surveillance, and at least one full solar wafer without being cut, configured to function as power source for the camera subsystem. The camera subsystem comprises a lens, PCB electronics including a WiFi chip and/or a RF chip, and a battery that are enclosed in one or multiple modules.

27 Claims, 5 Drawing Sheets

CAMERA SUPPORTED BY SOLAR WAFER

CROSS-REFERENCE TO RELATED APPLICATIONS

This application claims priority to U.S. provisional patent application No. 63/127,296, entitled "CAMERA SUPPORTED BY SOLAR WAFER," filed on Dec. 18, 2020. The content of this U.S. provisional patent application is hereby incorporated by reference in its entirety for all purposes.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Field of the Invention

The present disclosure relates to camera system, in particular, to camera system primarily for indoor use.

Description of Related Art

Cameras are popularly utilized both indoors and outdoors, e.g. for surveillance purpose. In some applications, outdoor camera may be powered by solar energy, without the need of access to electrical power. However, so far there is no indoor camera system available in which the camera may be powered by solar energy without being plugged in a wall outlet. This is because it is believed that there is no sufficient solar energy indoors to power camera e.g. for surveillance purpose.

The present disclosure addresses this and other prior art shortcoming.

BRIEF SUMMARY OF THE INVENTION

Embodiments are presented herein of, inter alia, camera systems (e.g. primarily for indoor use), which may be powered from solar energy or through light bulbs or LEDs (e.g. by using solar cells or solar wafer) without the need of being plugged in a wall outlet.

In an embodiment of the present disclosure, a camera assembly is provided that comprises: a camera subsystem configured to provide camera surveillance, and at least one full solar wafer without being cut, configured to function as power source for the camera subsystem; wherein the camera subsystem comprises a lens, PCB electronics including a WiFi chip and/or a RF chip, and a battery that are enclosed in one or multiple modules.

In another embodiment of the present disclosure, a camera assembly is provided that comprises: a camera subsystem configured to provide camera surveillance, solar panel configured to convert solar energy to electric energy, a battery configured to power the camera subsystem, a charging subsystem configured to receive electric energy from the solar panel and to charge the battery, the charging subsystem comprising a low power charger that operates under low lighting condition and a high power charger that operates under high lighting condition, and a switching mechanism configured to switch between the low power charger and the high power charger depending on lighting condition, to enable an efficient charging to the battery for both low and high lighting conditions.

In a further embodiment of the present disclosure, a camera assembly primarily for surveillance purposes is provided that comprises: a camera subsystem configured to provide camera surveillance, a high-speed communication chip configured to communicate the surveillance data from the camera subsystem to server or to user terminal, and a low power communication chip configured to listen for surveillance instruction or motion detection and to wake up the camera subsystem and the high-speed communication chip for camera surveillance upon receiving surveillance instruction or motion detection; wherein the camera subsystem and the high-speed communication chip are shut off after an OFF instruction is received or after a determined time period has lapsed since wake-up.

In another further embodiment of the present disclosure, a camera assembly is provided that comprises: a camera subsystem configured to provide camera surveillance, and at least one full solar wafer without being cut, configured to function as power source for the camera subsystem; wherein the camera subsystem is arranged on one surface of the at least one full solar wafer, or is arranged next to the at least one full solar wafer.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The various preferred embodiments of the present invention described herein can be better understood by those skilled in the art when the following detailed description is read with reference to the accompanying drawings. The components in the figures are not necessarily drawn to scale and any reference numeral identifying an element in one drawing will represent the same element throughout the drawings. The figures of the drawing are briefly described as follows.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE INVENTION

Figure 1:
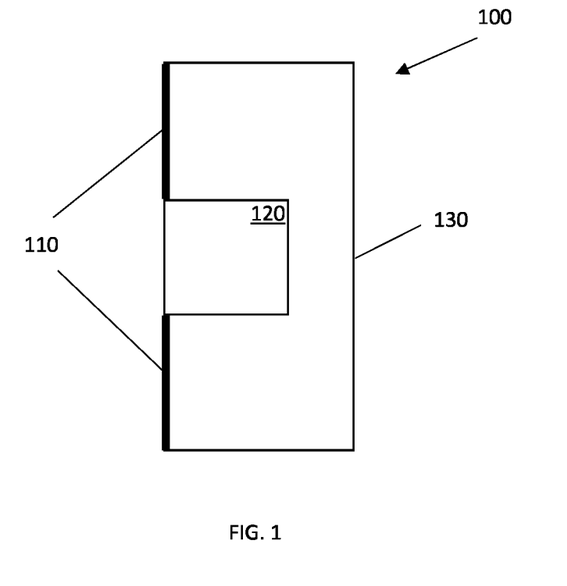
FIG. 1 illustrates a schematic sectional view of an exemplary camera assembly primarily for indoor use according to an embodiment of the present disclosure.

FIG. 1 illustrates a schematic sectional view of an exemplary camera assembly 100 primarily for indoor use according to an embodiment of the present disclosure, in which solar cells 110 are provided around a camera subassembly 120 comprising camera and associated electronics, with the solar cells 110 being flush with the backside of the camera subassembly 120. It is to be noted that the elevation of the solar cells 110 may range from being flush with the backside of the camera subassembly 120 to being flush with the front side of the camera subassembly 120.

A clear housing 130, e.g. made of clear plastic or glass, may be placed over the solar cells 110 and the camera subassembly 120, to protect them and to allow light to come in and hit the solar cells 110.

Figure 1A:
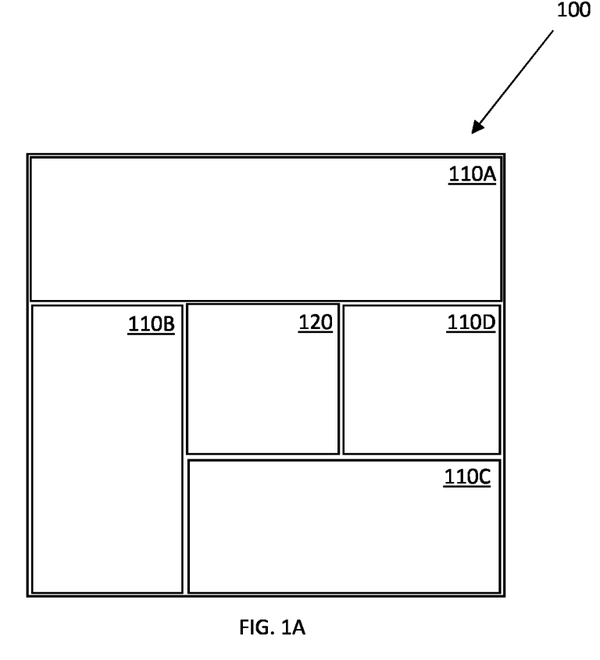
FIG. 1A illustrates a schematic plan view of the exemplary camera assembly as illustrated in FIG. 1.

FIG. 1A illustrates a schematic plan view of the exemplary camera assembly 100 as illustrated in FIG. 1. It can be seen from FIG. 1A that the camera subassembly 120 is provided in the center, and four solar cells 110A, 110B, 110C, and 110D is provided around the camera subassembly 120. It is to be noted that the arrangement of the solar cells around the camera subassembly as shown in FIG. 1A is for illustration only, and the solar cells can be arranged around the camera subassembly in other ways, which also falls within the sprit and scope of the present disclosure.

The solar cells 110 (110A, 110B, 110C, and 110D) operates as power source to the camera subassembly. For this reason, in the exemplary camera assembly 100 there provides a battery that is connected to the camera to power it, and a charger that receives power from the solar cells 110 to charge the battery. In this illustrated embodiment of the present disclosure, it is designed that solar cells substantially surround and provide power to the camera subassembly.

It is appreciated that the solar cells are manufactured by cutting a solar wafer, which is usually approximately 5 inches by 5 inches (but it also could be 6 inches by 6 inches or 8 inches by 8 inches). However, it is also appreciated that especially for indoor use, a solar wafer's efficiency is compromised when it is cut into smaller solar cell(s), e.g. up to ten times less.

Figure 2:
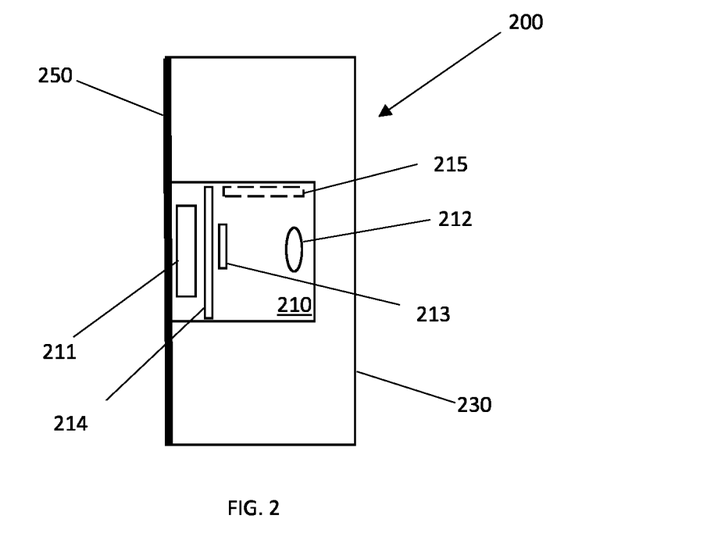
FIG. 2 illustrates a schematic sectional view of another exemplary camera assembly, primarily for indoor use, according to an embodiment of the present disclosure.

FIG. 2 illustrates a schematic sectional view of an exemplary camera assembly 200, primarily for indoor use, according to an embodiment of the present disclosure, in which a full solar wafer 250, e.g. of approximately 5 inches by 5 inches, is used as base, on top of which a camera subassembly 210 is provided in the center. Since the solar wafer 250 is not cut, its efficiency is not compromised.

Figure 2A:
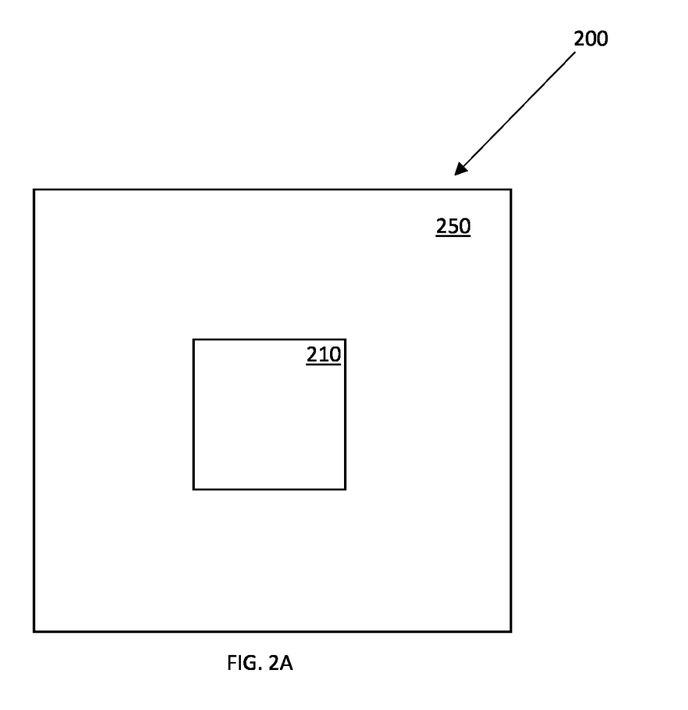
FIG. 2A illustrates a schematic plan view of the exemplary camera assembly as illustrated in FIG. 2.

FIG. 2A illustrates a schematic plan view of the exemplary camera assembly 200 as illustrated in FIG. 2. It can be seen from FIG. 2A that the camera subassembly 210 is provided on top of the solar wafer 250 in the center.

Those skilled in the art will appreciate that there may provide more than one full solar wafer to operate as power source in a camera assembly according an embodiment of the present disclosure.

Figure 2B:
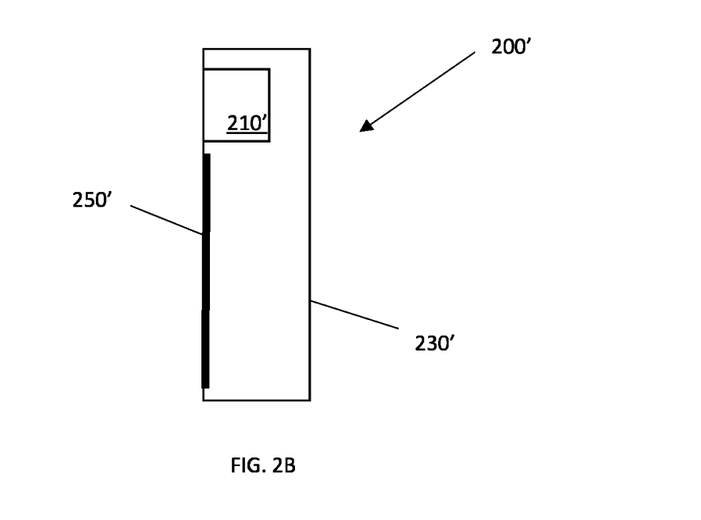
FIG. 2B illustrates a schematic sectional view of a further exemplary camera assembly according to an embodiment of the present disclosure.

Also, those skilled in the art will appreciate that the camera subassembly may be provided anywhere on top of the solar wafer, e.g. at a corner of the solar wafer, or even may be provided outside of the solar wafer, e.g. next to (a side of) the solar wafer. As an example, FIG. 2B illustrates a schematic sectional view of an exemplary camera assembly 200' in which a camera subassembly 210' is provided next to a full solar wafer 250' and a clear housing 230' is placed over the camera subassembly 210' and the solar wafer 250'.

It is to be noted that in the present disclosure, the term "on top of" a solar wafer is intended to mean "on" one surface of a solar wafer with a portion (of that surface) of the wafer being blocked. That is, in the present disclosure when a camera subassembly is described as being provided on top of a solar wafer, the camera subassembly is placed on one surface of the solar wafer, either in the center or on side, and blocks a portion (of that surface) of the solar wafer.

As an illustrated example, the camera subassembly 210 may comprise battery 211, lens 212, CCD or camera chip 213, PCB 214 with associated electronics thereon, and, if desired, additional optional PCB(s) 215.

In this exemplary camera assembly 200, a full solar wafer 250 is used without being cut, and a camera subassembly 210 including a battery 211, PCB 214, and etc. is provided on top of the wafer 250 in the center. It is to be noted that, it is possible for the camera subassembly 210 to be provided on either one of the two surfaces of the wafer 250. A clear housing 230, e.g. made of plastic or glass, is provided to cover the camera subassembly 210 and the solar wafer 250, such that the light can come in. As mentioned above, the camera assembly 200 has a higher efficiency especially for indoor use, when compared with those prior art ones using solar cells cut from wafer. It is appreciated that camera subassembly may comprises a CCD or camera chip, a camera or lens, a compression chip, a Wifi chip or other communication means (e.g. RF) that communicates with external equipment, and there may exists battery that powers all components in the camera subassembly, and a charging circuit that charges from the solar wafer (or solar cells in FIGS. 1 and 1A) to the battery and therefore powers all these components, in an embodiment of the present disclosure.

In the example as illustrated in FIG. 2, all components of the camera subassembly 210 are provided in a package (as a module) on top of the solar wafer 250, i.e. on one surface of the solar wafer. It is appreciated that it is not necessary for all these components to be provided on top of the solar wafer. Alternatively, in some implementations, at least multiple but not all of the components of the camera subassembly are provided on top of the solar wafer. For example, some components such PCB and/or battery may be placed behind the solar wafer, i.e. on the other (opposite) surface of the solar wafer, and be connected to the components on top of the solar wafer through e.g. a wire going over the solar wafer.

In an embodiment of the present disclosure, a charger plug may be provided on the clear housing 230 that is connected through a wire to the camera subassembly 210 and configured to mate with an external charger, such that the camera assembly can operate when no power is produced from the solar energy.

Figure 2C:
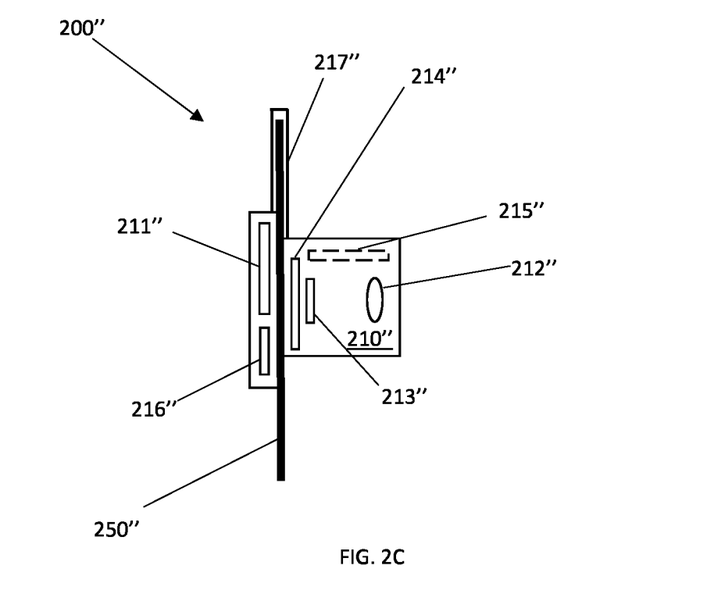
FIG. 2C illustrates a schematic sectional view of another further exemplary camera assembly according to an embodiment of the present disclosure.

FIG. 2C illustrates a schematic sectional view of an exemplary camera assembly 200" according to an embodiment of the present disclosure, in which a full solar wafer 250" is used as base with two modules being provided on the two opposite surfaces of the solar wafer respectively. In the illustrated example, on one side of the solar wafer 250" a module 210" is provided that comprises lens 212", CCD or camera chip 213", PCB 214" with associated electronics thereon, and, if desired, additional optional PCB(s) 215", while on the other surface of the solar wafer 250" another module is provided that comprises battery 211" and charging circuit 216". The two modules are electrically connected by a wire 217".

Figure 2D:
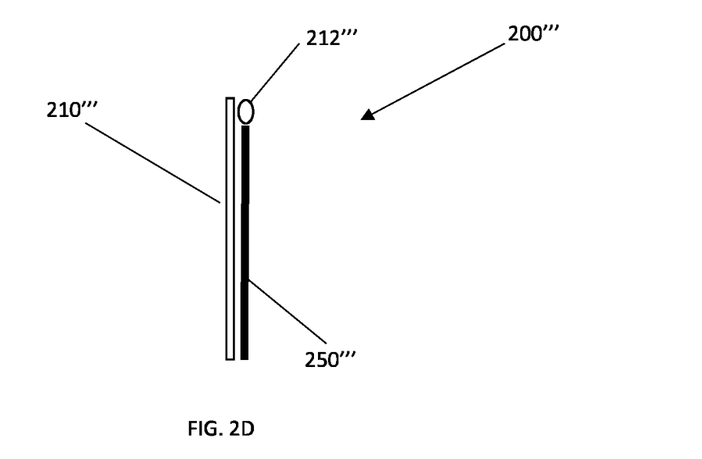
FIGS. 2D and 2E illustrate respectively a schematic sectional view and a schematic top view of an exemplary camera assembly according to an embodiment of the present disclosure.
Figure 2E:
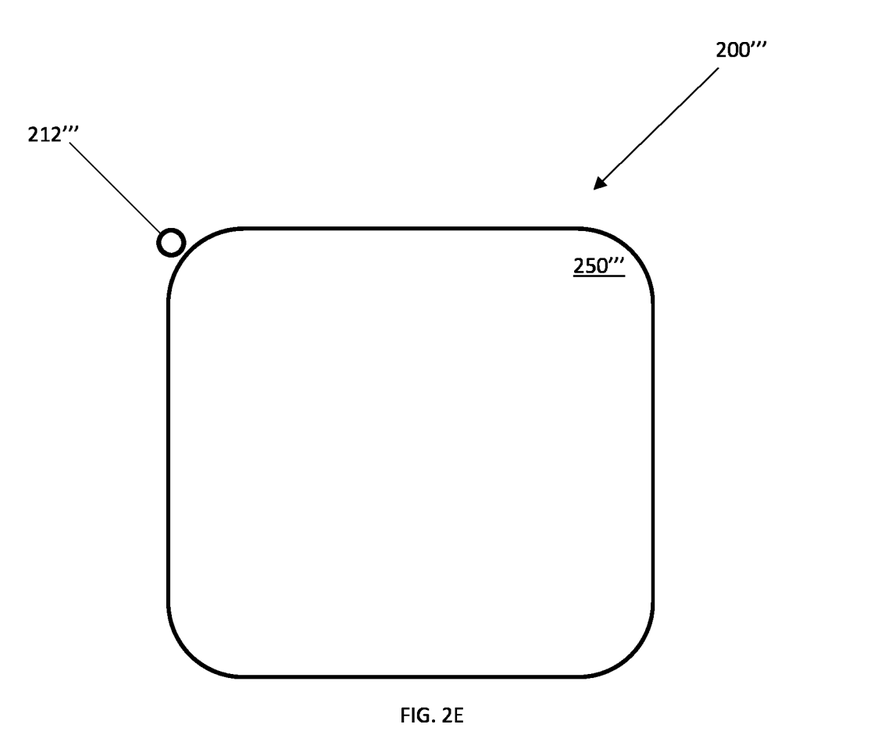

Alternatively, in an embodiment of the present disclosure, the lens of a camera subsystem is provided on the edge, e.g. at one of the corners, of a solar wafer or a solar cell, while all other components of the camera subsystem are provided behind the wafer or cell. FIGS. 2D and 2E illustrate respectively a schematic sectional view and a schematic top view of an exemplary camera assembly 200''' according to an embodiment of the present disclosure, in which lens 212''' is provided at a corner of a solar wafer 250''' while all other components such as CCD or camera chip, PCB with associated electronics thereon, etc., e.g. being assembled in a module 210''', are provided behind the wafer 250'''.

Figure 3:
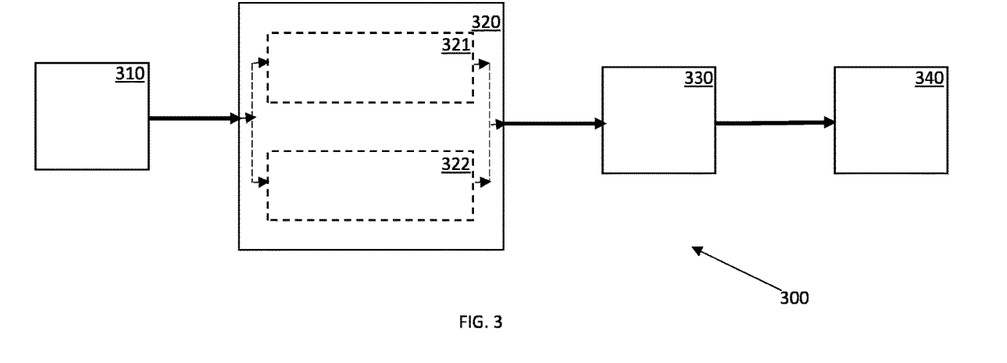
FIG. 3 illustrates a schematic block diagram of an exemplary camera assembly according to an embodiment of the present disclosure.

FIG. 3 illustrates a schematic block diagram of an exemplary camera assembly 300 according to an embodiment of the present disclosure. As illustrated, a solar wafer 310 is connected to a charging subsystem 320 that uses the power received from the solar wafer 310 to charge a battery 330. In turn, the battery 330 is connected to and powers a camera subsystem 340 including electronics and camera.

It is to be noted that even for indoor use there might exist strong sunlight in sunny weather that passes through the window and hits the solar wafer or cells of an indoor camera assembly, in which condition the solar wafer or cells can produce a lot of power. It is also appreciated that there is little or even no sunlight in cloudy or rainy weather and at night that can passes through the window and hits the solar wafer or cells of an indoor camera assembly, in which condition the solar wafer or cells can produce only very little or even no power. And in such low or no sunlight condition, there might exists indoor lighting e.g. lamp, from which the solar wafer or cells can produce power.

Further, it is understood by those skilled in the art that a single charging circuit will not be able to operate with the same or similar efficiency for both high and low power, i.e. for both high and low lighting condition. Therefore, for different lighting conditions different type of power charging circuit needs to be developed, e.g. for solar wafer or cells.

In consideration of the above, in an embodiment of the present disclosure at least two charging circuits are provided in the charging subsystem.

As illustrated in FIG. 3, the charging subsystem 320 may comprise a low power charger 321 that operates under low lighting condition and a higher power charger 322 that operates under normal or higher lighting condition. It is appreciated that when a camera assembly e.g. 300 is used indoors, it and in particular its solar wafer e.g. 310 need to be able to operate under low lighting condition, e.g. under the dim light from a lamp, in which condition the low power charger 321, a special low energy charger, is configured to receive the dim light and to charge the battery 330 with the low energy received from the dim light.

With the at least two different charging circuits, one of which operates under low lighting condition and another one of which operates under high lighting condition, the camera assembly of an embodiment of the present disclosure can operate indoors efficiently for both low and high lighting conditions, and also can operate efficiently outdoors.

In order to distinguish between the low lighting condition and the normal or higher lighting condition, there may provide a light sensor that senses the ambient light condition and determines whether there is sufficient light and whether to use the low power charger 321 or the higher power charger 322.

Alternatively, the amount of current being received from the solar wafer (or solar cells in FIGS. 1 and 1A), i.e. the amount of current produced by the solar wafer (or solar cells in FIGS. 1 and 1A), may be used to distinguish between the low lighting condition and the normal or higher lighting condition.

Further, a switching mechanism is provided to switch between these charging circuits based on the lighting condition. In an embodiment of the present disclosure, one of the chips in the camera subsystem, whether it is compression chip, WiFi chip, Bluetooth chip or low power RF chip, or one of other chips in the camera subsystem, may function as the switching mechanism, i.e. receives the lighting condition information from light sensor or determines the lighting condition based on the amount of current produced by the solar wafer or cells, and then decides which charging circuit is more efficient and thus should be used for the current lighting condition, and therefore performs the switching between the charging circuits. The charging circuit that is switched on is used to adapt the voltage or current of the power received from the solar wafer or cells so as to charge the battery efficiently.

Figure 4:
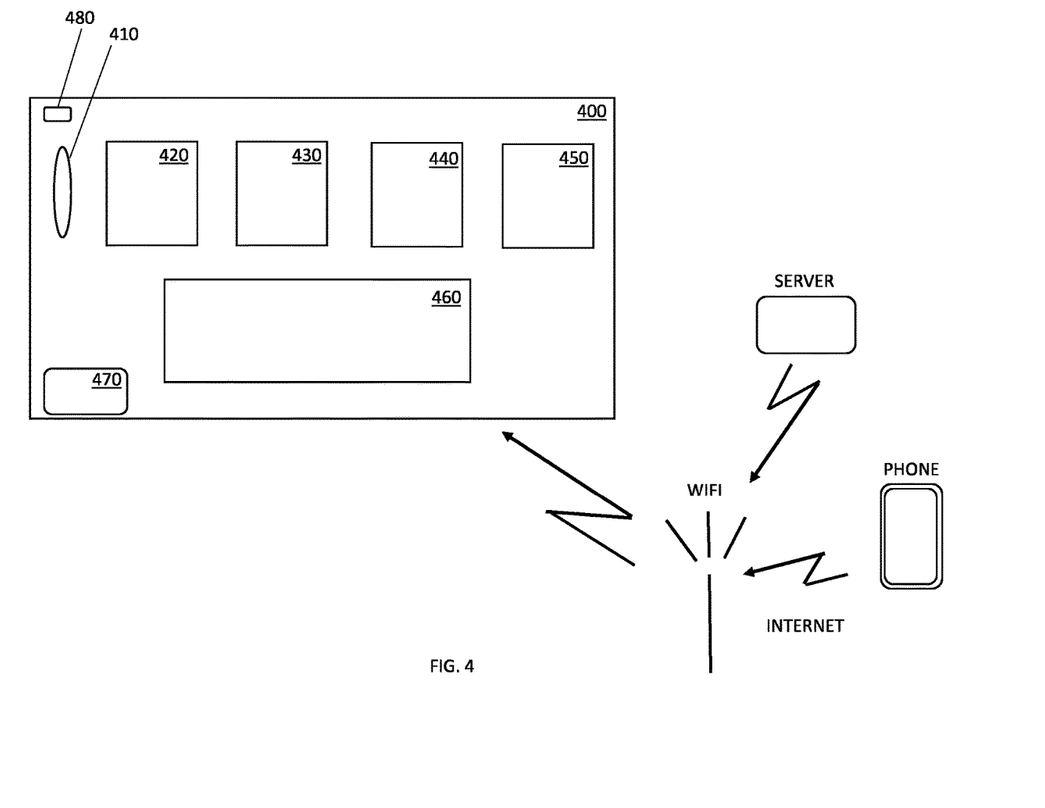
FIG. 4 illustrates a schematic block diagram of another exemplary camera subsystem according to an embodiment of the present disclosure.

FIG. 4 illustrates a schematic block diagram of an exemplary camera subsystem 400 according to an embodiment of the present disclosure. As illustrated, the camera subsystem 400 comprises lens 410, camera chip 420, compression chip 430 that compresses the image captured by the camera chip 420 through the lens 410, CPU 440, and WIFI chip 450.

It is appreciated that these components in the camera subsystem require a lot of power to operate. For example, WiFi chip is a high-power-consumption element and can process high speed transmission. However, under low lighting condition, especially for indoor use, the solar wafer or cells may not be able to produce sufficient power for their operation. In consideration of this, some or all of these components are configured to normally be asleep and be waked up only when needed, in an embodiment of the present disclosure.

Therefore, in an embodiment of the present disclosure these components in the camera subsystem are normally asleep, and a low power chip is provided to wake up these components e.g. when camera surveillance is needed. For example, a low power RF chip such as Bluetooth chip is provided that is always on and listening and is able to wake up other components such as the above-mentioned components in the camera subsystem, such that those other components operate only for a short period of time to capture surveillance data and are shut off for most of the time. Further, it is appreciated that a low power chip e.g. low power RF chip may not be able to process high speed transmission that WiFi chip can, and thus both low power RF chip e.g. Bluetooth chip and WiFi chip are provided in the assembly in an embodiment of the present disclosure.

In an embodiment of the present disclosure where the camera assembly is provided with both a WiFi chip and a Bluetooth chip or low power RF chip, the Bluetooth chip or low power RF chip is always on and listening for e.g. surveillance instruction or for motion detection and wakes up other components including the WiFi chip when necessary.

As described above, in the camera subsystem 400, a Bluetooth chip or low energy RF 460 is always on and listening and is configure to power on or off the components necessary for camera surveillance (e.g. all other components) of the camera subsystem 400.

In an embodiment of the present disclosure, the camera subsystem 400 may further comprise a motion sensor 470 that is connected to the Bluetooth chip or low energy RF 460 and is also always on. Then, upon detecting a motion, the motion sensor 470 instructs the Bluetooth chip or low energy RF 460 to wake up (power on) the components necessary for camera surveillance (e.g. all other components) of the camera subsystem 400.

In particular, the Bluetooth chip or low energy RF 460, e.g. upon receiving a request for camera or in response to the detection of motion by the motion sensor 470, wakes up (powers on) the components necessary for camera surveillance (e.g. all other components) of the camera subsystem 400. When these components of the camera subsystem 400 are powered on, under the control of the CPU 440, the camera chip 420 captures the surveillance data (e.g. image or video) through the lens 410, the compressing chip 430 compresses the surveillance data (e.g. image or video) and sends the compressed data to WIFI chip 450 for transmission e.g. to a phone or a server.

As an example, during the normal operation, in the camera subsystem 400 only the Bluetooth chip or low energy RF 460 and the motion sensor 470 (if exist) are on and listening or sensing, while other components are all powered off. Then the Bluetooth chip or low energy RF 460 receives a signal e.g. from a cellphone via WIFI hotpot through Internet or from the motion sensor 470 that detected motion, requesting surveillance with the camera. Upon receiving this signal, the Bluetooth chip or low energy RF 460 powers on all other components of the camera subsystem 400, which in turn provide the surveillance. Later, all components other than the Bluetooth chip or low energy RF 460 and the motion sensor 470 (if exist) in the camera subsystem 400 are powered off, e.g. after a predetermined time period lapses or after the Bluetooth chip or low energy RF 460 receives an OFF signal e.g. from the cellphone or from the motion sensor 470. Then again, only the Bluetooth chip or low energy RF 460 and the motion sensor 470 (if exist) are on and listening or sensing. In this way, the power consumption of the camera subsystem 400 is reduced substantially.

As mentioned above with respect to FIG. 3, there may provide a light sensor 480 that is configured to sense the ambient light condition in order to distinguish between the low lighting condition and the normal or higher lighting condition, in an embodiment of the present disclosure.

In an embodiment of the present disclosure, more components of the camera subsystem 400 may be powered on when there is sufficient or extra power being present, in order to provide a faster response. On the other hand, when there is no sufficient or extra power, only the Bluetooth chip or low energy RF 460 and the motion sensor 470 (if exists) are always on, in order to reduce the power consumption, as described above.

For example, under low lighting condition, e.g. when the low power charger e.g. 321 in FIG. 3 is being used or when the amount of current produced by the solar wafer or cells is less than a predetermined threshold value, all components other than the Bluetooth chip or low energy RF 460 and the motion sensor 470 (if exist) can be shut off. On the other hand, under normal or higher lighting condition, e.g. when the higher power charger e.g. 322 in FIG. 3 is being used or when the amount of current produced by the solar wafer or cells is greater than the predetermined threshold value, some additional components can be power on e.g. through the higher power charger which is charging the battery at the same time, in order to provide a faster response time in case there is a motion being sensed or a surveillance request being received.

Then when there is a motion being sensed or a surveillance request being received, the Bluetooth chip or low energy RF 460 only need power on other components necessary for camera surveillance (e.g. all other components), then starts to send surveillance data (e.g. image or video) to phone (e.g. the phone that transmitted the surveillance request or the phone that is registered in association with the camera) and/or to server.

In some cases, the surveillance data may be first transmitted to and stored on server, and then be transmitted to phone. In other cases, the surveillance data is transmitted directly to phone. For example, in a scenario where a request for camera surveillance is transmitted from a phone to the camera, in particular to the Bluetooth chip or low energy RF 460, the surveillance data e.g. video may be transmitted directly to the requesting phone. Or in a scenario where a motion detected by the motion sensor e.g. 470 triggers the camera surveillance, the surveillance data e.g. video may be transmitted to and saved on the server, or the surveillance data may be transmitted directly to the phone that is registered in association with the camera, or the surveillance data may be transmitted to both the server and the phone.

It is appreciated that, when the low power chip e.g. low power RF chip or Bluetooth chip wakes up other components in the camera subsystem, it takes time to boot up each one of the components such as chips. As described above, in the camera subsystem, there is a WiFi chip connected to a compression chip that compresses the data, and there is a camera chip. Also it is appreciated that for different components e.g. chips it might take different amount of time to boot up. So it is not practical to start camera surveillance only when all these components are booted up, because it is desired to capture surveillance data as soon as the motion happens or the surveillance instruction is sent.

Therefore, in an embodiment of the present disclosure a memory is provided in order to streamline the boot-up procedure. In this embodiment of the present disclosure, when the motion detector detects a motion or when the low power chip receives a surveillance instruction, the low power chip wakes up the components necessary for camera surveillance, e.g. the compression chip, the camera chip and the WiFI chip. In response to the wake-up instruction from the low power chip, the compression chip and camera chip might wake up right away, but the WiFi chip spends a longer time to wake up and to connect the WiFi. As soon as the camera chip wakes up, it starts to capture and transmit surveillance data to the compression chip. Then the compression chip, when waking up, starts to compress surveillance data. At this point, if the WiFi chip is not ready, the compression chip stores surveillance data into the memory. Next, whenever the WiFi chip is ready, it transmits the surveillance data stored in the memory, and the compression chip transmits surveillance data directly to the WiFi chip for transmission.

As mentioned above, when there is sufficient or extra power being produced by the solar wafer or cells, more components of the camera subsystem may be powered on in order to provide a faster response. That is, when there is sufficient or extra power from the solar wafer or cells, the camera chip and/or the compression chip may be already awake before the surveillance instruction is received/sent or before motion is detected, in an embodiment of the present disclosure.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A camera assembly, comprising:
a camera subsystem configured to provide camera surveillance; and
at least one full solar wafer without being cut, configured to function as power source for the camera subsystem;
wherein the camera subsystem comprises a lens, PCB electronics including a WiFi chip and/or a RF chip, and a battery that are enclosed in one or multiple modules, and wherein all or some of the one or multiple modules are placed next to the at least one solar wafer.

2. A camera assembly, comprising:
a camera subsystem configured to provide camera surveillance; and
at least one full solar wafer without being cut, configured to function as power source for the camera subsystem; and
a clear cover placed over the camera subsystem and the at least one solar wafer;
wherein the camera subsystem comprises a lens, PCB electronics including a WiFi chip and/or a RF chip, and a battery that are enclosed in one or multiple modules.

3. A camera assembly, comprising:
a camera subsystem configured to provide camera surveillance;
solar panel configured to convert solar energy to electric energy;
a battery configured to power the camera subsystem;
a charging subsystem configured to receive electric energy from the solar panel and to charge the battery, the charging subsystem comprising a low power charger that operates under low lighting condition and a high power charger that operates under high lighting condition; and
a switching mechanism configured to switch between the low power charger and the high power charger depending on lighting condition, to enable an efficient charging to the battery for both low and high lighting conditions.

4. The camera assembly of claim 3, wherein the camera subsystem comprises camera chip, compression chip, CPU, Wifi chip, and Bluetooth® or RF chip, one of which functions as the switching mechanism.

5. The camera assembly of claim 4, wherein the switching mechanism determines the lighting condition based on amount of current being received from the solar panel.

6. The camera assembly of claim 3, further comprising a light sensor configured to detect an ambient light condition, wherein the switching mechanism receives the lighting condition from the light sensor.

7. The camera assembly of claim 3, wherein the solar panel is composed of at least one full solar wafer without being cut or is composed of solar cells.

8. The camera assembly of claim 3, further comprising a clear cover placed over the camera subsystem and the solar panel.

9. A camera assembly primarily for surveillance purposes, comprising:
a camera subsystem configured to provide camera surveillance;
a high-speed communication chip configured to communicate surveillance data from the camera subsystem to server or to user terminal; and
a low power communication chip configured to listen for surveillance instruction or motion detection and to wake up the camera subsystem and the high-speed communication chip for camera surveillance upon receiving surveillance instruction or motion detection;
wherein the camera subsystem and the high-speed communication chip are shut off after an OFF instruction is received or after a determined time period has lapsed since wake-up.

10. The camera assembly of claim 9, wherein the high-speed communication chip is a WiFi chip, and the low power communication chip is a low power RF chip or a Bluetooth chip.

11. The camera assembly of claim 9, wherein the camera subsystem comprises a camera or lens, a camera chip, a compression chip that compresses the surveillance data captured by the camera chip through the camera or lens, and a CPU.

12. The camera assembly of claim 9, further comprising a motion sensor configured to detect motion.

13. A camera assembly, comprising:
a camera subsystem configured to provide camera surveillance;
at least one full solar wafer without being cut, configured to function as power source for the camera subsystem;
a battery configured to power the camera subsystem; and
a charging subsystem configured to receive the power produced by the at least one full solar wafer and to charge the battery,
wherein the camera subsystem is arranged on one surface of the at least one full solar wafer, or is arranged next to the at least one full solar wafer.

14. The camera assembly of claim 13, wherein the camera subsystem, the battery and the charging subsystem are assembled into a package that is arranged on one surface of the at least one full solar wafer.

15. The camera assembly of claim 14, wherein the camera subsystem is arranged on one surface of the at least one full solar wafer, while the battery and the charging subsystem are arranged on the other opposite surface of the at least one full solar wafer, and wherein the camera subsystem is connected to the charging subsystem via wire going over the solar cell.

16. The camera assembly of claim 14, wherein the charging subsystem comprises a low power charger configured to operate under low lighting condition, and a high power charger configured to operate under high lighting condition.

17. The camera assembly of claim 16, wherein the lighting condition is determined by a light sensor, or based on the amount of current produced by the full solar wafer.

18. A camera assembly, comprising:
a camera subsystem configured to provide camera surveillance;
at least one full solar wafer without being cut, configured to function as power source for the camera subsystem; and
a clear cover placed over the camera subsystem and the at least one solar wafer,
wherein the camera subsystem is arranged on one surface of the at least one full solar wafer, or is arranged next to the at least one full solar wafer.

19. A camera assembly, comprising:
a camera subsystem configured to provide camera surveillance; and
at least one full solar wafer without being cut, configured to function as power source for the camera subsystem;
wherein the camera subsystem comprises a lens, PCB electronics including a WiFi chip and/or a RF chip, and a battery that are enclosed in one or multiple modules, and wherein the one or multiple modules are all placed on one surface of the at least one solar wafer and partially block the at least one solar wafer.

20. A camera assembly, comprising:
a camera subsystem configured to provide camera surveillance; and
at least one full solar wafer without being cut, configured to function as power source for the camera subsystem;
wherein the camera subsystem comprises a lens, PCB electronics including a WiFi chip and/or a RF chip, and a battery that are enclosed in one or multiple modules, and wherein among the one or multiple modules, some are placed on or beside one surface of the at least one solar wafer, and the others are placed on other opposite surfaces of the at least one solar wafer, and wherein the modules on one surface of the at least one solar wafer are connected to the modules on the other opposite surface of the at least one solar wafer via wire going over the solar wafer.

21. A camera assembly, comprising:
a camera subsystem configured to provide camera surveillance, and comprising a lens, and a printed circuit board (PCB) with electronics; and
at least one full solar wafer without being cut, configured to function as power source for the camera subsystem;
wherein the camera subsystem is arranged on one surface of the at least one full solar wafer, or is arranged next to the at least one full solar wafer, and wherein more electronics on the PCB are powered on under higher lighting condition than under lower lighting condition.

22. The camera assembly of claim 21, wherein the lighting condition is determined by a light sensor, or based on an amount of current produced by the full solar wafer.

23. A camera assembly, comprising:
a camera subsystem configured to provide camera surveillance;
at least one full solar wafer without being cut, configured to function as power source for the camera subsystem;
a battery configured to power the camera subsystem; and
a charging subsystem configured to receive the power produced by the at least one full solar wafer and to charge the battery;
wherein the camera subsystem is arranged on one surface of the at least one full solar wafer, or is arranged next to the at least one full solar wafer, and wherein the camera subsystem, the battery and the charging subsystem are assembled into a package that is arranged on one surface of the at least one full solar wafer.

24. The camera assembly of claim 23, wherein the camera subsystem is arranged on one surface of the at least one full solar wafer, while the battery and the charging subsystem are arranged on the other opposite surface of the at least one full solar wafer, and wherein the camera subsystem is connected to the charging subsystem via wire going over the solar cell.

25. A camera assembly, comprising:
a camera subsystem configured to provide camera surveillance, and comprising a lens, and a printed circuit board (PCB) with electronics; and
at least one full solar wafer without being cut, configured to function as power source for the camera subsystem;
wherein the camera subsystem is arranged on one surface of the at least one full solar wafer, or is arranged next to the at least one full solar wafer, and wherein the lens and the PCB with electronics are arranged on two opposite surfaces of the at least one full solar wafer respectively.

26. A camera assembly, comprising:
a camera subsystem configured to provide camera surveillance; and
at least one full solar wafer without being cut, configured to function as power source for the camera subsystem;
wherein the camera subsystem comprises PCB electronics including a WiFi chip and/or a RF chip, and a battery that are enclosed in one or multiple modules, and a lens, and wherein the lens is provided on the edge of the at least one full solar wafer without being cut, while all other components of the camera subsystem are provided behind the at least one full solar wafer without being cut.

27. A camera assembly primarily for surveillance purposes, comprising:
a camera subsystem configured to provide camera surveillance;
a high-speed communication chip configured to communicate surveillance data from the camera subsystem to server or to user terminal; and
a low power communication chip configured to listen for surveillance instruction or motion detection and to wake up the camera subsystem and the high-speed communication chip for camera surveillance upon receiving surveillance instruction or motion detection;
wherein the camera subsystem and the high-speed communication chip are shut off after an OFF instruction is received or after a determined time period has lapsed since wake-up, and
wherein the camera subsystem comprises a memory, a camera or lens, a camera chip, a compression chip that compresses the surveillance data captured by the camera chip through the camera or lens, and a CPU, and wherein the camera subsystem provide camera surveillance immediately when its component(s) necessary for camera surveillance is/are ON and stores the surveillance data in the memory which is further processed and/or transmitted when respective component(s) is/are ON or able to transmit.

* * * * *